(12) United States Patent
Butzmann

(10) Patent No.: US 10,110,035 B2
(45) Date of Patent: Oct. 23, 2018

(54) ELECTRIC ENERGY STORAGE DEVICE AND METHOD FOR INCREASING THE VOLTAGE AT THE STORAGE DEVICE TERMINALS

(71) Applicants: Robert Bosch GmbH, Stuttgart (DE); Samsung SDI Co., Ltd., Yongin-si, Gyeonggi-do (KR)

(72) Inventor: Stefan Butzmann, Schalksmühle (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 50 days.

(21) Appl. No.: 14/910,397

(22) PCT Filed: Aug. 1, 2014

(86) PCT No.: PCT/EP2014/066569
§ 371 (c)(1),
(2) Date: Feb. 5, 2016

(87) PCT Pub. No.: WO2015/018748
PCT Pub. Date: Feb. 12, 2015

(65) Prior Publication Data
US 2016/0197505 A1    Jul. 7, 2016

(30) Foreign Application Priority Data

Aug. 7, 2013    (DE) .................. 10 2013 215 572

(51) Int. Cl.
*H02J 7/34*    (2006.01)
*H02J 7/00*    (2006.01)
(Continued)

(52) U.S. Cl.
CPC .......... *H02J 7/0065* (2013.01); *B60L 3/0046* (2013.01); *B60L 11/1803* (2013.01);
(Continued)

(58) Field of Classification Search
CPC ....... H02J 7/0065; H02J 7/345; B60L 3/0046; B60L 11/1803
(Continued)

(56) References Cited

U.S. PATENT DOCUMENTS

2005/0254275 A1    11/2005  Nojima et al.
2011/0198936 A1    8/2011   Graovac et al.
2012/0025768 A1*   2/2012   Nakano .............. B60L 11/005
                                                        320/116

FOREIGN PATENT DOCUMENTS

DE    10 2010 041 029 A1    3/2012
DE    10 2011 002 608 A1    7/2012
(Continued)

OTHER PUBLICATIONS

International Search Report corresponding to PCT Application No. PCT/EP2014/066569, dated Oct. 16, 2014 (German and English language document) (5 pages).

*Primary Examiner* — Edward Tso
*Assistant Examiner* — Aaron Piggush
(74) *Attorney, Agent, or Firm* — Maginot, Moore & Beck LLP

(57) ABSTRACT

An electric energy storage device includes two electrical terminals. The energy storage device further includes at least one first current path configured to electrically connect to the two terminals. The energy storage device further includes at least two energy storage modules configured to be connected to form a series connection of the energy storage modules. The energy storage modules include multiple storage units and a controllable multiple-voltage level converter. The converter is configured to optionally connect the one or more storage units in the first current path for the incremental adjustment of a module voltage, as at least one of a (Continued)

function of a control signal of a control and regulating device of the electric energy storage device.

6 Claims, 2 Drawing Sheets

(51) Int. Cl.
*B60L 3/00* (2006.01)
*B60L 11/18* (2006.01)
*H02M 7/487* (2007.01)
*H02M 7/483* (2007.01)

(52) U.S. Cl.
CPC ........... *B60L 11/1864* (2013.01); *H02J 7/345* (2013.01); *B60L 2240/547* (2013.01); *B60L 2240/549* (2013.01); *B60L 2270/20* (2013.01); *H02M 7/487* (2013.01); *H02M 2007/4835* (2013.01); *Y02T 10/7005* (2013.01); *Y02T 10/7061* (2013.01)

(58) Field of Classification Search
USPC .......................................... 320/116, 163, 167
See application file for complete search history.

(56) References Cited

FOREIGN PATENT DOCUMENTS

| DE | 10 2012 212 556 A1 | 1/2014 |
|----|---------------------|--------|
| DE | 10 2012 212 646 A1 | 1/2014 |
| WO | 2011/124260 A1 | 10/2011 |

\* cited by examiner

ELECTRIC ENERGY STORAGE DEVICE AND METHOD FOR INCREASING THE VOLTAGE AT THE STORAGE DEVICE TERMINALS

This application is a 35 U.S.C. § 371 National Stage Application of PCT/EP2014/066569, filed on Aug. 1, 2014, which claims the benefit of priority to Serial No. DE 10 2013 215 572.7, filed on Aug. 7, 2013 in Germany, the disclosures of which are incorporated herein by reference in their entirety.

The present disclosure is directed to an electric energy storage device, in particular a battery device, having two electrical terminals and at least one current path electrically connecting the two terminals, in which multiple energy storage modules of the energy storage device are connected to form a series connection of these energy storage modules, wherein at least one of the energy storage modules includes multiple storage units. The present disclosure furthermore relates to a method for increasing the voltage at the terminals of such an electric energy storage device.

BACKGROUND

It is becoming apparent that in the future, stationary applications, for example, wind turbines, as well as vehicles, for example, electric and hybrid vehicles, will increasingly use modularly configured electric energy storage devices, in particular batteries or battery devices, as voltages sources, on which very high demands will be made with respect to reliability. The reason for these high demands is that a failure of an energy storage module of the device, for example, a battery cell of the battery device, may result in a failure of the overall system. For example, in an electric vehicle, a failure of the traction battery thus results in a stranded vehicle. The failure may even result in safety-related problems. Thus, in wind turbines, batteries are used as energy stores in order to protect the wind turbine from unallowable operating conditions during heavy wind via a rotor blade adjustment. If a failure occurs, the wind turbine may enter such an unallowable operating state under some circumstances.

The energy storage modules are often connected to an energy storage device in the intermediate circuit (DC link circuit) of an inverter system or a converter system. This intermediate circuit is provided with a capacitive component, the intermediate-circuit capacitor, for keeping the DC voltage constant and for suppressing voltage peaks. In principle, the capacitive element must be pre-charged for this purpose. The energy storage modules of the electric energy storage device are connected in parallel with the capacitive component in the intermediate circuit.

If the electric energy store were to be connected directly to the capacitive component without pre-charging, an extremely high current would flow instantaneously until the capacitive component were charged, since an energy store, for example, a battery, has a low internal resistance and the capacitive component acting as an intermediate-circuit capacitor has a high electrical capacitance. This would result in extreme aging and early failure of these components. Therefore, it is necessary to pre-charge the capacitive component by applying moderate current.

In order to be able to disconnect the energy storage device or its energy storage modules in a corresponding vehicle from the vehicle's on-board electrical system, two switching devices designed as power switches, usually contactors, are typically provided, each being arranged in one of the main current paths. However, when switching on the two contactors, a considerable current would flow into the capacitive component forming the intermediate circuit capacitor. Therefore, a pre-charging current path including a so-called pre-charging contactor and including a protective resistor is provided, which is connected in parallel with the contactor in the first main current path.

For pre-charging, first, the pre-charging contactor and the main contactor attached to the other terminal of the electric energy storage device, i.e., in the second main current path, are switched on. As a result, the capacitive component acting as an intermediate-circuit capacitor is initially charged with a limited current. As soon as the voltage across the capacitive component is sufficiently large, the main contactor is switched on.

Disadvantages of the described method include the relatively high cost, the relatively large installation space required, and the weight of the pre-charging contactor and the component providing the pre-charging resistance.

The electric energy storage device according to the present disclosure having the features mentioned in claim 1 and the method according to the present disclosure having the features mentioned in claim 9 offer the advantage that the charging of a capacitive component may be carried out in a simple, gentle, and space-saving manner.

In the electric energy storage device, it is provided that the at least one energy storage module includes a controllable multiple-voltage level converter for an optional connection of one or several of its storage units in the current path for the incremental adjustment of a module voltage, as a function of a control signal of a control and/or regulating device of the electric energy storage device. With the aid of the multiple-voltage level converter(s), the voltage at the terminals of the electric energy storage device may be increased in small voltage increments. These voltage increments are smaller than the voltage of a single storage unit of the at least one energy storage module which includes the controllable multiple-voltage level converter. Such an energy storage device is particularly suitable for pre-charging a capacitive component connected to the terminals of the energy storage device, in particular an intermediate-circuit capacitor of an intermediate circuit downstream from the energy storage device. Due to the small increments when increasing the voltage, high current peaks do not result in the capacitive component; therefore, this component does not age so rapidly.

The smallest storage units of the electric energy storage modules are the storage cells. The electric energy storage device is in particular a battery device including battery modules which are connected to form at least one series circuit. At least one of these battery modules includes multiple battery units, preferably battery cells, and a controllable multiple-voltage level converter (multi-level converter). Such a battery device may, for example, be designed as a traction battery device for electric or hybrid vehicles.

According to one preferred embodiment of the present disclosure, the maximum module voltage lies is twice as high or more than twice as high as the voltage of the individual storage units of the at least one energy storage module including the controllable multiple-voltage level converter.

In particular, the maximum module voltage is in the extra-low-voltage range (also colloquially referred to as the low-voltage range or weak-current range). Extra-low voltage (ELV) is a voltage whose upper voltage limit does not exceed the limit value of the voltage range I according to IEC 60449. The limit value for DC voltage is 120 V. This value corresponds to the limit for the permanently permissible contact voltage for adult humans and normal application cases, which is not deemed to be life-threatening. Safety extra-low voltage (SELV) is a voltage which provides particular protection from electric shock due to its low level. If the nominal DC voltage is less than 60 V, protection from direct contact is not necessary. Particularly preferably, the maximum module voltage is in the safety extra-low voltage range, i.e. at most 60 V.

According to one advantageous specific embodiment of the present disclosure, the maximum module voltage is in the range 50 V≤X<60 V. The electric energy storage device may be made up of relatively few energy storage modules, it being possible to handle the modules without special knowledge or special equipment with respect to voltage, for example, when exchanging a module in a repair shop. On the other hand, it is ensured via the multiple-voltage level converter(s) and the control and/or regulating device that the voltage may be increased in substantially smaller voltage increments.

According to one advantageous embodiment of the present disclosure, all energy storage modules of the device include multiple storage units and a multiple-voltage level converter. According to one alternative embodiment of the present disclosure, at least one of the energy storage modules does not include a controllable multiple-voltage level converter. This at least one energy storage module is configured by means of an associated switching device to optionally accommodate the at least one storage unit of this module in one section of the current path or alternatively to short-circuit this section of the current path.

According to another preferred embodiment of the present disclosure, each of the controllable multiple-voltage level converters includes a circuit arrangement including controllable switches and including diode elements. With the aid of such electric components, it is possible to structure a controllable multiple-voltage level converter in a relatively simple manner. The controllable switches are preferably designed as power semiconductor components, in particular as power transistors such as power MOSFETs (metal-oxide semiconductor field-effect transistors). The diode elements are semiconductor components which allow current to pass in only one direction and which block the current, i.e., have high resistance, in the other direction.

Advantageously, the energy storage device includes a parallel circuit made up of multiple current paths connecting the two terminals electrically. Energy storage modules are situated in each of the current paths. A sufficient output current is available due to the parallel circuit.

According to yet another preferred embodiment of the present disclosure, the energy storage device includes a capacitive component acting as an intermediate-circuit capacitor, which is arranged in a current path between the terminals. Advantageously, it is thus provided that the energy storage device includes a converter device connected to the two terminals in parallel with the current path including the capacitive component. An electric machine may then be connected to this converter device.

In the method according to the present disclosure for increasing the voltage at the terminals of an electric energy storage device, in particular an aforementioned electric energy storage device, it is provided that the electric energy storage device includes at least one current path electrically connecting the two terminals, in which multiple energy storage modules are connected to form a series connection of these modules, wherein at least one of the energy storage modules, in particular each of these energy storage modules, includes multiple storage units, preferably storage cells, wherein the at least one energy storage module includes a controllable multiple-voltage level converter for an optional connection of one or several of its storage units in the current path for incrementally increasing a module voltage as a function of a control signal, and the voltage at the terminals is increased by controlling the multiple-voltage level converters in an increment which is at least on average smaller than the maximum module voltage of the at least one energy storage module including the multiple-voltage level converter. In this context, the increment may be understood to mean the height of the voltage step. The method is in particular a method for pre-charging a capacitive component connected to the terminals.

BRIEF DESCRIPTION OF THE DRAWINGS

The present disclosure is explained in greater detail below based on drawings.

DETAILED DESCRIPTION

Figure 1:
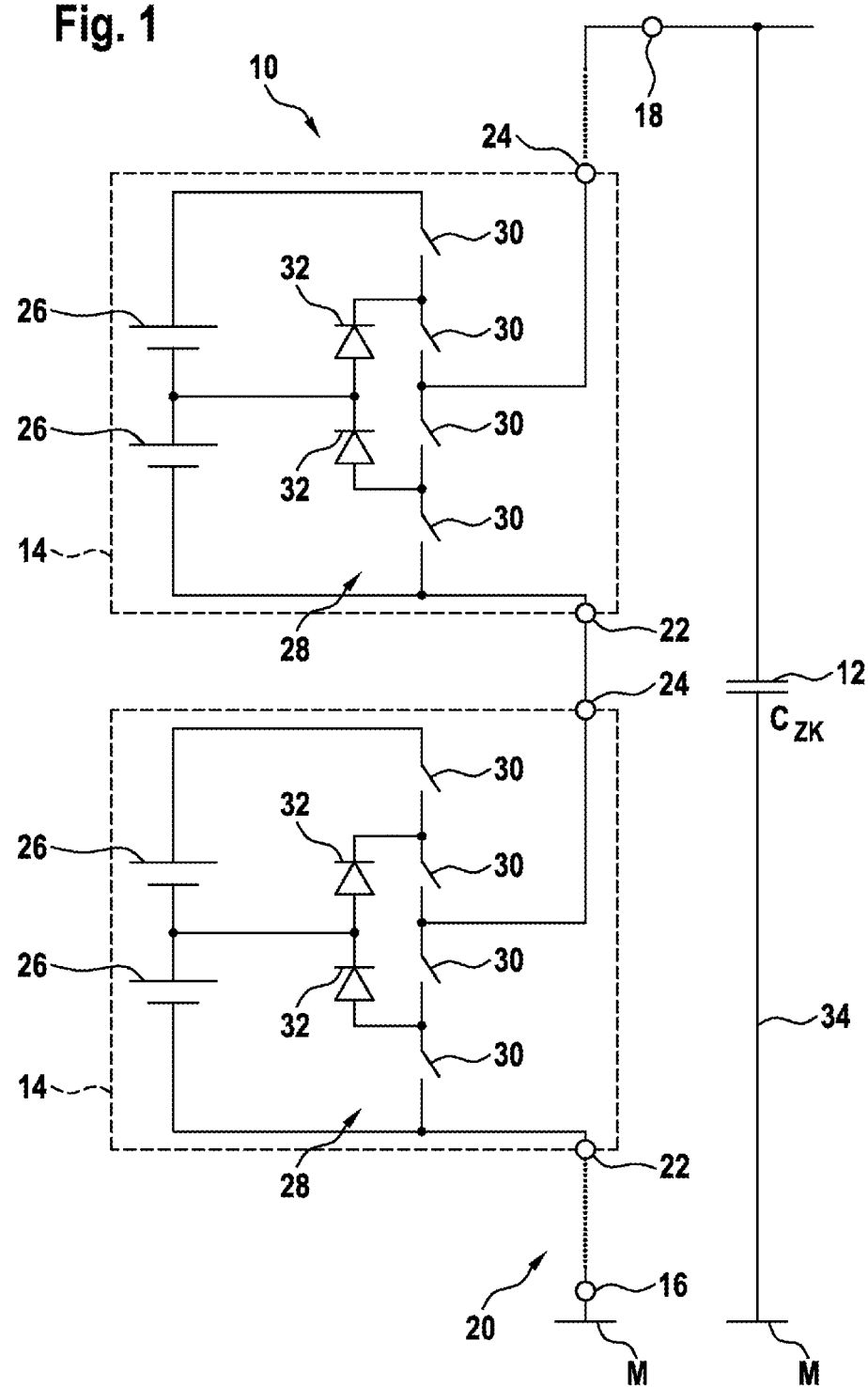
FIG. 1 shows a schematic representation of an electric energy storage device for pre-charging a capacitive component connected to the terminals of this device according to a first specific embodiment of the present disclosure.

FIG. 1 shows a schematic representation of a modularly configured electric energy storage device 10 for pre-charging a capacitive component 12 connected to a connecting apparatus of this device 10. This capacitive component 12, for example, constitutes an intermediate-circuit capacitor $C_{ZK}$ of an intermediate circuit which is not depicted in greater detail. The depicted electric energy storage device 10 is designed as a battery device with a series connection of energy storage modules 14, wherein these energy storage modules 14 are designed as battery modules in such a battery device.

The depicted electric energy storage device 10 includes two electrical terminals 16, 18 of the connecting apparatus and a current path 20 electrically connecting the two terminals 16, 18, in which several of the energy storage modules 14 are connected via their respective two module terminals 22, 24 to form a series connection of energy storage modules 14. The one terminal 16 is connected to a reference potential (ground M). The other terminal 18 is at an electric potential which is determined by the sum of the module voltages of the energy storage modules 14 serially connected in the current path. In FIG. 1, only two modules 14 of the corresponding series connection of the electric energy storage modules 14 are depicted by way of example.

Each of the energy storage modules 14 of the electric energy storage device 10 has multiple (in FIG. 1, exactly two) storage units 26 designed as storage cells and a controllable multiple-voltage level converter (multi-level converter) 28 for the optional connection of one of the two storage units 26 or a series connection of the two storage units 26 of this module 14 in the current path 20.

Each of the controllable multiple-voltage level converters 28 includes a circuit arrangement including controllable switches 30 and including diode elements 32. The circuit arrangement is configured in such a way that, via corresponding control of the switches 30, optionally either (i) each of the storage units 26 individually, or (ii) a series connection of the two storage units 26, or (iii) a short-circuit current path, may be interconnected between the module terminals 22, 24 as a function of a control signal of a control and/or regulating device (not shown) of the electric energy storage device 10.

The following function and the following advantages of the electric energy storage device result:

By controlling the multiple-voltage level converters 28, the voltage at the terminals 16, 18 of the electric energy storage device 10 is incrementally increased in an increment which corresponds to the voltage of the individual storage units 26. In the case of two storage units which supply the same output voltage, this increment thus corresponds to half the maximum module voltage.

Due to this increase of the voltage of the device 10, the capacitive component 12 arranged in a current path of the intermediate circuit between the terminals 16, 18 is pre-charged without the occurrence of higher current peaks at this capacitive component 12. Pre-charging in this way protects the capacitive component 12 and allows it to age less rapidly.

Figure 2:
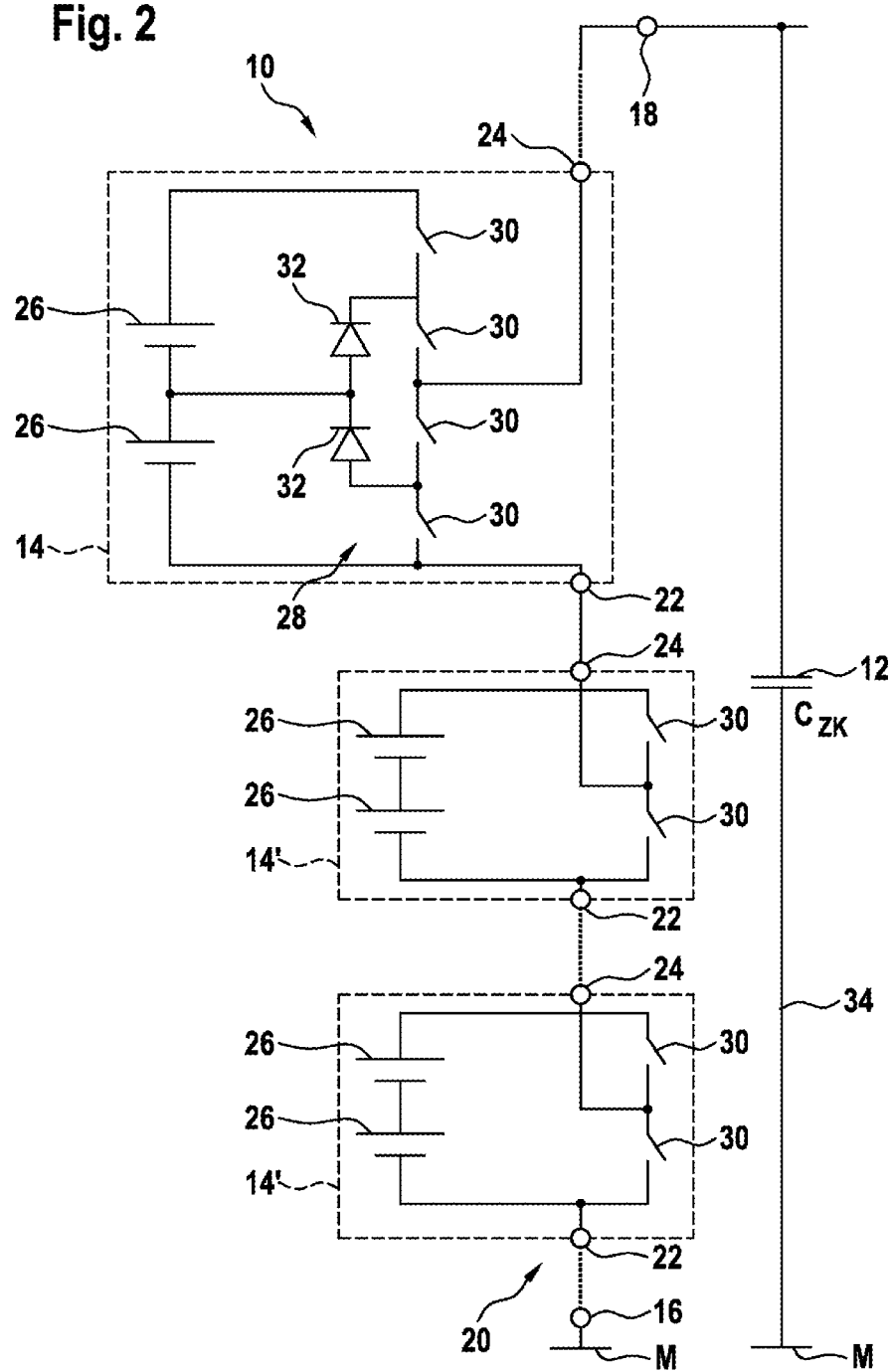
FIG. 2 shows a schematic representation of the electric energy storage device according to a second specific embodiment of the present disclosure.

FIG. 2 shows a second specific embodiment of the electric energy storage device 10. In this energy storage device 10, only one of the energy storage modules 14 is equipped with a multiple-voltage level converter 28. The other energy storage modules 14' are designed as conventional energy storage modules 14' in a half-bridge topology. Such energy storage modules 14' are equipped via their switching device to optionally accommodate their at least one storage unit 26 (here, their two storage units 26 connected in series) in a section of the current path 20, or alternatively to short-circuit this section of the current path 20.

When using a single energy storage module 14 including a multiple-voltage level converter 28 in the energy storage device 10, the voltage at the capacitive component (the capacitor voltage $U_{CZK}$) is incrementally increased via the module 14 including the converter 28, and subsequently, this module 14 is simultaneously bridged by means of the integrated switch 30, and in addition, a conventional energy storage module 14' is connected in a half-bridge topology.

In the embodiment of all energy storage modules 14 as energy storage modules 14 including multiple-voltage level converters 28 (as shown in FIG. 1), the voltage of the energy storage modules 14 is simply increased in succession incrementally.

In both specific embodiments, the electric energy storage device 10 according to the present disclosure allows increasing the voltage in smaller voltage steps, with the same number of modules. Lower current peaks thereby result at the capacitive component 12.

The invention claimed is:

1. An electric energy storage device, comprising:
   two electrical terminals;
   a first current path configured to electrically connect the two terminals;
   a first energy storage module configured to be connected to form a series connection of a plurality of energy storage modules in the first current path, the at least one energy storage module including:
     a first plurality of storage units,
     and
     a controllable multiple-voltage level converter comprising:
       two series-connected diodes; and
       a first switching device including four switches connected to the first plurality of storage units and to the two series-connected diodes, wherein the controllable multiple-voltage level converter is configured to operate the first switching device to connect at least one or more than one of the first plurality of storage units in the first current path for incremental adjustment of a module voltage based on a control signal of one of a control device and a regulating device of the electric energy storage device; and
   a second energy storage module connected in the first current path to the first energy storage module, the second energy storage module including:
     a second plurality of storage units, and
     a second switching device including two switches configured to connect each of the second plurality of storage units to the first current path in a first configuration in which a first switch in the second switching device is closed and a second switch in the second switching device is open and to short-circuit a section of the first current path that is included in the second energy storage module to bypass each of the second plurality of storage units in a second configuration in which the first switch in the second switching device is open and the second switch in the second switching device is closed.

2. The energy storage device as claimed in claim 1, wherein the first energy storage module includes the controllable multiple-voltage level converter that produces a maximum voltage of the first energy storage module that is at least twice as high as a voltage of each storage unit in the first plurality of storage units of the first energy storage module.

3. The energy storage device as claimed in claim 1, wherein a maximum voltage of the first energy storage module is 120 volts.

4. The energy storage device as claimed in claim 1, further comprising:
   a capacitive component configured to act as an intermediate-circuit capacitor and arranged in a second current path between the terminals.

5. The energy storage device as claimed in claim 4, further comprising:
   a converter device connected to the two terminals in parallel with the second current path including the capacitive component.

6. The electric energy storage device as claimed in claim 1, wherein the electric energy storage device is a battery device.

* * * * *